United States Patent [19]

Kato

[11] 4,364,826
[45] Dec. 21, 1982

[54] WATERWHEEL SYSTEM FOR AERATION

[76] Inventor: Masashi Kato, Daito-shi, Japan

[21] Appl. No.: 253,600

[22] Filed: Apr. 13, 1981

[51] Int. Cl.³ .............................................. C02F 3/08
[52] U.S. Cl. .................................. 210/150; 210/219; 210/220; 261/92
[58] Field of Search .............................. 210/615–619, 210/150, 151, 220, 219, 620, 629; 261/92

[56] References Cited

U.S. PATENT DOCUMENTS

| | | | |
|---|---|---|---|
| 3,540,589 | 11/1970 | Boris | 210/150 |
| 3,747,904 | 7/1973 | Gross | 261/92 |
| 3,956,127 | 5/1976 | Holmberg | 210/150 |
| 4,022,689 | 5/1977 | Kato et al. | 261/92 |
| 4,153,430 | 5/1979 | Cheng et al. | 261/92 |
| 4,160,736 | 7/1979 | Prosser | 210/150 |
| 4,184,946 | 1/1980 | Kato | 261/92 |
| 4,256,580 | 5/1981 | Rimmele | 261/92 |

Primary Examiner—Benoit Castel
Attorney, Agent, or Firm—George B. Oujevolk

[57] ABSTRACT

A waterwheel system for aerating water in sewage treatment tanks and fishponds, etc., an aerator waterwheel system in which a plurality of honeycombed tubes are arranged, and securely held in place, encircling a rotary shaft, between discs mounted on both ends of the said rotary shaft and parallel thereto, thereby forming a waterwheel; this waterwheel is disposed near the water surface of the water tank so that the honeycombed tubes situated at the bottom are immersed in water; the aeration of water is made by turning the aforementioned waterwheel by use of a driving means at such a rotary speed that heavy splashing will not be produced from the aforementioned waterwheel; this way of aeration of water is so effective that this system is economical, and is finding wide uses such a sewage treatment, supply of oxygen and cooling of hot and warm water.

6 Claims, 13 Drawing Figures

WATERWHEEL SYSTEM FOR AERATION

BACKGROUND OF THE INVENTION

The present invention relates to a water wheel system for making the aeration or the cooling of water in sewage treatment tanks or in fishponds.

BRIEF DESCRIPTION OF THE PRIOR ART

In a sewage treatment method utilizing active sludge, agitation and aeration of water by ejecting compressed air from an air blowing device disposed at the bottom of a water tank, thereby imparting oxygen to bacteria to promote their breeding, so that clarification of water may be achieved through consumption of organic matters in water.

In such a sewage treatment method involving aeration, because of the very large difference in weight between water and air, air bubbles abruptly float up; consequently, notwithstanding the large effect of agitation thus attained, the all important time for water to make contact with air for dissolving oxygen in it is short, resulting in very low efficiency of aeration.

With increasing blowing depths, the required pressure or the potential energy increases. Thus this pressure energy is exhausted without contributing much to the effect of aeration. This interprets the reason why the active sludge process requiring use of a large absolute amount of oxygen consumes extremely large power.

Also in the active sludge process based on the splashing and sprinkling system by use of a high speed rotary impeller at the water surface or the method of aeration by the waterwheel system in fishponds, the splashing is extinguished in a short period of time like in the previous method. Moreover, since the energy loss resulting from collision between water, solids and air increases in direct proportion to the square of their relative velocities, at high rotational speeds of the waterwheel, the impact energy loss is excessively large, thus consuming more power than in the previous method.

There is a known system for cooling hot or warm water; a water cooling tower system is used for sprinkling a large amount of heavy water raised to the top of the tower. Such a cooling system is disadvantageous in that its operating efficiency is lower than the method of water bottom blow-off, consuming great energy, and moreover, this system requires higher installation costs.

The present invention provides a waterwheel system for aeration characterized in that the waterwheel is formed by encircling its central shaft with a plurality of honeycombed tubes, and the agitation and aeration of water are effected by turning this waterwheel relatively slowly, while keeping the honeycombed tubes at the bottom position immersed in water.

The first object of this invention is to provide a waterwheel for aeration which requires the least energy consumption without the reduction in the effect of agitation and aeration of water.

The second object of this invention is to provide a waterwheel system which requires no piping work, nor involves any troubles of monitoring the operation of the air compressor and of checking and repairing for clogging of the air blowing device which will take place with passage of time.

The third object of this invention is to provide a waterwheel system which does not produce noise during its operation, which has excellent strength and durability, and which is highly economical, being manufactured and maintained at lost costs.

The fourth object of this invention is to provide a waterwheel system which has a wide range of uses including sewage treatment, oxygen supply to fishponds, cooling of hot and warm water, etc.

These objects may be carried out through improvements and combinations of parts constituting this invention and modifications of the way of operation. In the following description, some embodiments of this invention are described in detail with reference to the accompanying drawings:

DETAILED DESCRIPTION

Figure 1:
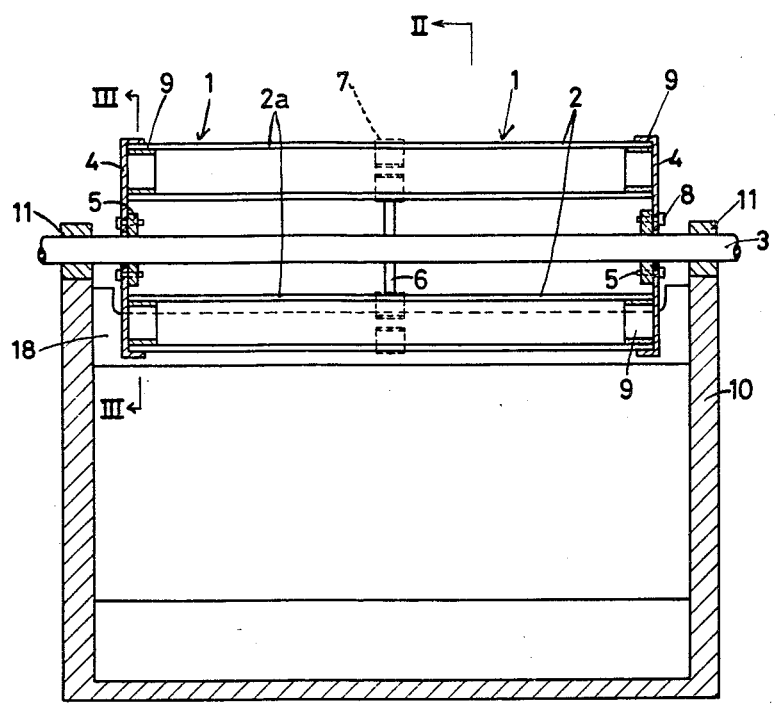
FIG. 1 represents a longitudinal front view showing the water wheel system of this invention.

Referring to FIGS. 1 through 5, the aerator waterwheel 1 is composed of a rotary shaft 3, a plurality of honeycombed tubes 2a made of a synthetic resin disposed around this rotary shaft 3, and held parallel thereto, forming tube wings 2, and a pair of circular end plates 4 fixed to both ends of the rotary shaft 3, and supporting the honeycombed tubes 2a at their ends.

The said aerator waterwheel 1, although its diameter is relatively small, has such a large length in the direction of its rotary shaft 3, as corresponds with the width of the treatment water tank, which presents a largely differentiated notion from the formerly accustomed thin large diameter waterwheels. This waterwheel should run as slow a rotational speed as 10 m/min. to 100 m/min., making a range of moderate revolutions, such that sticking animals and plants are not deposited, and bred to grow, but its impact on water is so small as not to produce heavy splashing.

The tube wings 2 for scooping up water, the major component of the waterwheel 1, are long honeycombed tubes 2a made of a synthetic resin. A plurality of them are placed along the outer circumference of the waterwheel 1, arranged at specified intervals and parallel to the rotary shaft 3 of the waterwheel. They are integrated with the rotary shaft 3 through the disc 4,4 at both ends of the shaft, the disc fittings 5,5 integral with the shaft 3 and the clamping bolts 8,8 . . . put therebetween, to be turned therewith. For a waterwheel having a width more than twice as large as its diameter, means are provided to prevent the wobbling at the center of the tube wing 2, which is formed of a small diameter honeycombed tube 2a that occurs when it is scooping up water. This is done by securely locating intermediary supports 6 on the rotary shaft 3 for fixing the tube wing 2 at plural positions on the rotary shaft 3, as required, thereby providing the intermediary supports for the tube wing 2. As an illustration of such a support, semi-circular bands 7 . . . and 8 . . . are applied, and clamped about the tubes from outside, as shown in FIG. 1.

In that way, even through the tube wings 2 are honeycombed tubes 2a made of a synthetic resin having little strength, the waterwheel 1 with a large width is very sturdy. For rigid securing between the tube wings 2 and the end plates 4, a clamping method by the use of intermediary supports 6 and semicircular bands 7 may be employed. In order to provide the aerator waterwheel 1 with the water raising function, as described later, however, a perfectly circular disc 4 having a diameter nearly equal to the outer circumference of the waterwheel is desirable for prevention of water leakage in the directions toward both ends of the rotary shaft 3. Thus, the end plates 4 and the tube wings 2 are rigidly secured onto a protruding support 9. The end of the tube wing 2 is input, and firmly set thereon, or it is inserted into a protruding support 9 . . . in the shape of a short tube with an inner diameter equal to the outer diameter of the tube wing 2. Either of these methods may be used and are more effectively by applying both means.

The rotary shaft 3 of said aeration waterwheel 1 is horizontally supported, as shown in FIG. 1, on top of the water tank walls 10 through the intermediary of bearings 11,11. It is so positioned above the water surface 12 that the bottom tube wing 2 is immersed in water, and to this shaft a low speed revolution falling in the range as above-described is imparted. The diagrammatic representation of the driving means for this revolution is omitted.

Speaking of the effects of the aerator waterwheel 1, it is understandable that because of the very small impact it gives onto the water surface at the low speed rotation, the energy loss involved in its running is much smaller than that in the high speed rotary wing waterwheels which produce heavy splashing, but its effect of aeration may be called into question. However, as the requirements for aeration, what are essential are how the contacting surface between water and air can be increased and whether the contacting surface parts can successively form new interfaces, and the best aeration is not the functions of splashing and dispersion, blowing-in of small bubbles and the air blow-off method.

Figure 4:
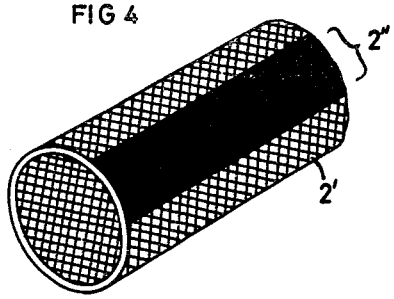
FIG. 4 denotes a perspective view showing an embodiment of the honeycombed tube made of a synthetic resin used in the waterwheel.
Figure 5:
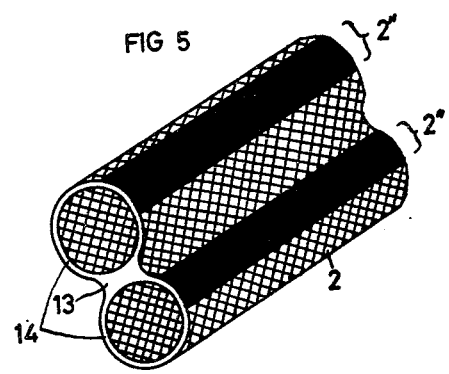
FIG. 5 designates similarly a perspective view showing the second embodiment of the honeycombed tube made of a synthetic resin, being a composite tube having two tubes integrated.

The tube wing 2 of the aerator waterwheel 1 of this invention is a honeycombed tube. When it submerges under water while turning, water jets into the tube through numerous small perforations on its circumference, expels air in the tube wing 2 to replace it, or captures air bubbles in admixture, and then, the air bubbles are discharged into the water. On the other hand, when this tube emerges above the water surface, water drips through numerous small perforations; air is sucked into the tube; the residual water captures air bubbles, and flows down, while rotating along the in- and out-side of the tube wing 2, following the angular positions of the turning tube wing 2, and so forth, so that not only the increase in the contacting surface with air but also ideal variation for aeration in the state of interface may be achieved in perfect compliance with the requirements for aeration. Such a tube wing has an aeration effect incomparable to that attainable with the mere plate wing which barely serves to entrain air or bring up water. On this ground, it offers a system no less efficient than the splashing and dispersing method, which suffers only very small impact loss, raises only a very small amount of water to a low level, thus consuming only very small energy. If the in- and out-side tube wall surfaces of the tube wing 2 are not mere porous smooth surfaces, and the rough surfaces have growing degrees of undulation, such surfaces are more effective for increasing dripping water and entraining air bubbles. For the honeycombed tubes of synthetic resins of this type, the mesh tube 2' as shown in FIG. 4 manufactured by the method of Japanese Patent Gazette Publication No. Sho 34-4185 or No. Sho 38-21224 said the best among other such tubes. This mesh tube 2' is woven of molten resin wires by bringing together and securing them in place, to be formed into a tubular shape, followed by setting by water cooling. The degree of undulating roughness on the in- and out-side surfaces is very coarse. Honeycombed tubes with such a high undulating surface roughness formed by a single process without relying on other treatments are not available. According to the method of this invention, the tube may be manufactured with part of the tube wall being a solid part (FIG. 4). This solid part 2'' is located in the place where the tube plays the role of a paddle plate for scooping up water when the waterwheel 1 is being turned. In that way, the waterwheel 1 has a higher capacity of scooping up water.

In the aspect of facility in manufacturing and strength, the waterwheel 1 having tube wings 2 of this invention is quite advantageous in comparison with the conventional plate wing type waterwheels. Such a waterwheel shows very small strain under the stress resulting from scooping up water, which is adequate for with some synthetic resins which have a strength only one several tenth of that of metal.

The tube wings 2 permit their assembling by way of easy and perfect fitting, and in this application where its use in the state of being submerged under water is the requirement, this tube wing is superior in corrosion resistance and durability to metal products; this superiority is remarkable especially where porosity and undulating roughness count.

Figure 3:
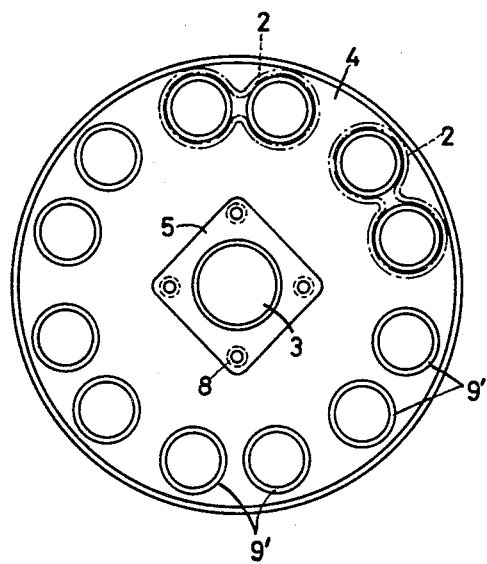
FIG. 3 is an enlarged side view showing an end plate of the waterwheel as seen from line III—III indicated by arrows in FIG. 1.
Figure 2:
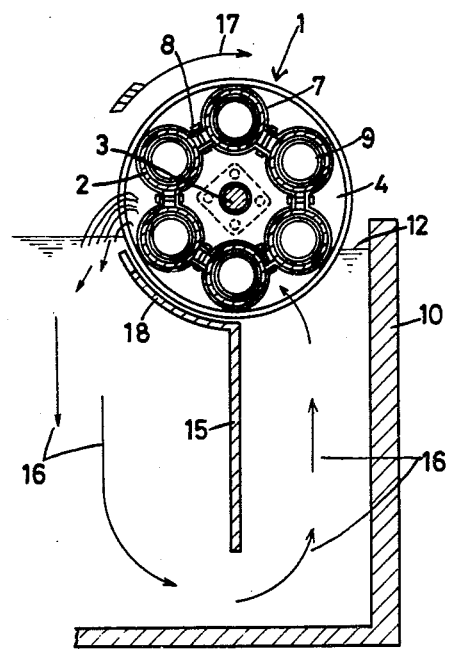
FIG. 2 is a longitudinal sectional side view taken on line II—II indicated by arrows in FIG. 1.

The rotary shaft 3 and the disc 4 of the waterwheel 1 should desirably be made of a non-corrosive metal, and for integral securing of assembly of metal and synthetic resin parts, adhesives are not effective, bolting tends to loosen, the method of engaging fitting of tube wings on disc may be said the best way of fixation. The employment of this tube wing 2 makes possible low cost manufacture of a waterwheel 1 which is very simplified, has a small number of parts, and is long and light in weight. Adaptation to the width of the already installed water tank may be made by altering the length of the rotary shaft 3 and the tube wing 2 of the waterwheel 1, then, the demand will be met by instant delivery of other quantity produced standardized parts on hand. In attempting to omit the intermediary supports, both ends of two honeycombed tubes are integrally welded as at 13 to form a composite tube 14, which in turn, is rigidly secured by end plates 4,4 having protruded supports 9′,9′ . . . for the composite tube, as shown in FIG. 3. With this assembly of a waterwheel 1, the major stress of water acting on the wing tubes 14 while the waterwheel 1 is turning is applied in the direction tangent to the outer circumference of the waterwheel 1, which is borne by the composite tube 14 possessing the strength of two tubes. Thus this waterwheel can bear larger stress.

Since this aerator waterwheel 1 makes its turning at a level where it is slightly immersed in the water surface 12, it is simply impossible for the bottom water in a deep water tank to be aerated. As a remedy, a vertical diaphragm 15 is placed through the intermediary depth of the water tank 10, extending in the direction of the waterwheel shaft 3, to partition the tank, thereby forming a U shape communicating vessel, and thus, providing a vertical circulation route of water flow in the tank (the arrow 16 in FIG. 2), and in addition, an arcuate diaphragm 18 contiguous to the top of the said diaphragm 15 is extended toward the turning direction (the arrow 17 in FIG. 2) of the waterwheel 1. In this way, the waterwheel will serve as a low lift water raising apparatus for producing circulation of a large amount of water at a very high efficiency without any backflow.

In that way, the low temperature heavy water at the bottom of the water tank can undergo repetition of the circulation (the arrow 16 in FIG. 2) in which the water is sucked up due to the effect of the communicating vessel, and is aerated, while being carried on the waterwheel, and is then, discharged on the water surface on the opposite side of the waterwheel; then, an agitating effect no less powerful than that achieved by the air-blowing device at the bottom of the water tank is attained. For this agitation, only the small head difference between both sides of the vertical diaphragm 15 affects the system as the consumption of the potential energy. Thus, consumption of potential energy required for counteracting the total pressure of the water depth in the air blow-off at the bottom of the water tank is entirely avoided, the consumption of potential energy in this apparatus being one several tenth of that in the water-bottom blow-off.

Figure 6:
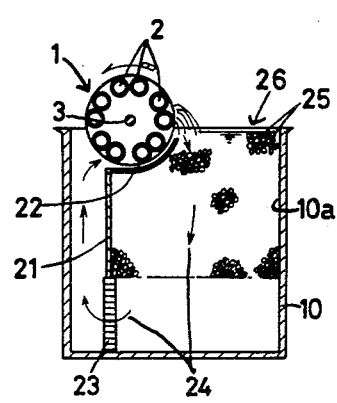
FIG. 6 shows a longitudinal front view of the waterwheel system of this invention as being used for sewage treatment.
Figure 7:
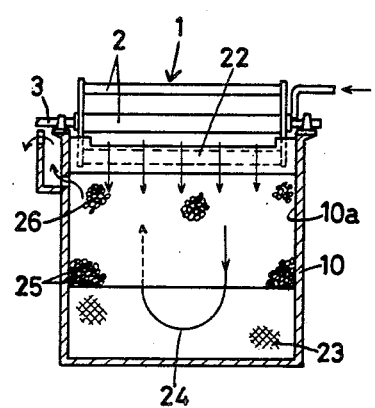
FIG. 7 gives a longitudinal side view of the same.

FIGS. 6 and 7 illustrate one of the best uses of the waterwheel device of this invention which is its use in a sewage treatment plant.

The aerator waterwheel 1 is mounted on the top of a treating tank 10 at such a level that the tube wings 2 at the lower level are immersed in the water to be treated. Then inside the treating tank 10, there are provided a vertical diaphragm 21 directly beneath the aerator waterwheel 1, an arcuate diaphragm 22 contiguous to the top of this diaphragm 21, following closely along the outer circumference at the bottom of the aerator waterwheel 1, and a screen 23 below the bottom of the vertical diaphragm 21, so that by the turning of the aerator waterwheel 1, a circulating water flow is induced as shown by the arrow 24 in FIG. 6, while inside one of the chambers 10a of the treating tank 10 bisected by the vertical diaphragm 21, a large number of filter media 25 made of a synthetic resin are put in in such an amount that they suspended in the water from the top of the screen 23 and reaching the water surface.

The filter medium 25 made of a synthetic resin is formed with a synthetic resin net tube. Such filter media are put into the treating tank 10 to compose a floating submerged filter bed 26, on which solid organic matters, if contained in the water to be treated, are to be captured.

Accordingly, when the aerator waterwheel 1 and the submerged filter bed 26 formed with synthetic resin filter media 25 are jointly utilized, a biological film filter tank holding aerobic microbes may be provided, in which the lower part of one chamber 10a also serves as the sludge settling tank, affording an extremely large area of contact between the aerobic microbes and the water to be treated. Thus a sewage treatment plant which is very compact, has high treating capacity and is low priced can be offered.

As the synthetic resin filter medium 25 used for forming the aforementioned submerged filter bed 26, hard polyethylene of around 0.95 specific gravity is preferable for its facility in separation from sludge, cleaning the clogged parts and handling. A flat laminated reticular small lump having a side about 50 mm which is formed of a net of thin unit wires of about 0.3 mm diameter as its base material, with the unit wires being thin but hard, disposed at intervals of 8-3 mm both vertically and laterally, and having no large cavities inside, is desirable. Ideally, such media individually should not get entangled in air or under water, but will slide on each other, thus dispersing inside the water tank, showing small resistance to water passage, and allowing the relative positions between them to be altered even by very small water flow and pressure.

Several examples of the filter medium 25 which satisfy these requirements are portrayed in FIGS. 8 through 14.

Figure 8:
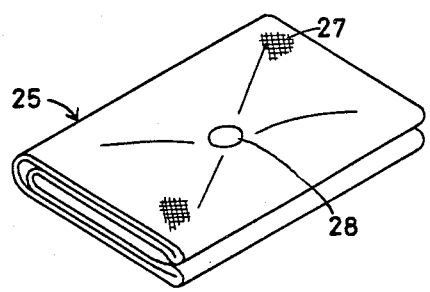
FIG. 8 depicts a perspective view showing the first embodiment of the filter medium of a synthetic resin for use in the aforementioned sewage treatment system.
Figure 9:
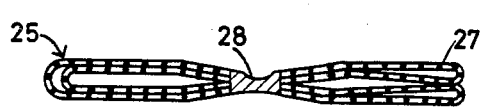
FIG. 9 is a longitudinal section of the same.

In the first example shown in FIGS. 8 and 9, a hard polyethylene net tube 27 formed with thin wires as the material is cut to a length of about 50 mm; each piece is flattened, folded in two, and then, heat-welded as at 28 of the overlapped part to be held in that shape.

Figure 11:
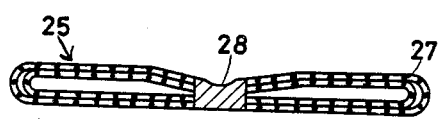
FIG. 11 portrays a longitudinal sectional view of the same.
Figure 10:
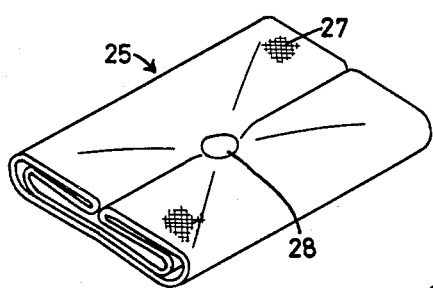
FIG. 10 provides a perspective view showing the second embodiment of the filter medium.

In the example of FIGS. 10 and 11, a net tube 27 similar to the above one is flattened; both side parts are respectively folded back onto one surface, and abutted at their edges; then, the abutted edges of respective folded-back parts are heat-welded as at 28.

Figure 12:
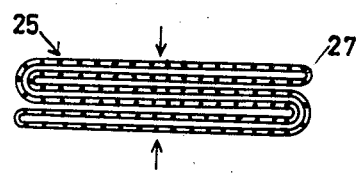
FIG. 12 gives a longitudinal sectional view showing the third embodiment of the filter medium.

In the example shown in FIG. 12, a net tube 27 the flattened state is folded back at both sides onto opposite surfaces to be folded in three, and the overlapped part is heat-welded as at 28.

In still another example which is not shown in the drawings, a net tube 27 being in the flattened state is folded in four by successive rolling, and the overlapped part is heat-welded in the same way as above-described.

Figure 13:
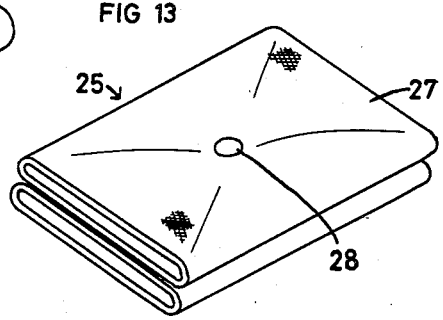
FIG. 13 draws up a perspective view showing the fourth embodiment of the filter medium.

In the example of FIG. 13, two of said net tube 27 being flattened are piled one upon another, and the center of the overlapped part is heat-welded. The number of net tubes 27 to be piled one upon another are not restricted to two, but three or more tubes may be freely chosen to meet the situation.

As hereabove described, besides the quite outstanding features in the aeration effect and energy saving, the aerator waterwheel 1 of this invention is advantageous in that the use of conventional air blow-off device and the piping work is not required; it is free of the troubles in the supervision of operation of air compressor or the check and repair for clogginess of the air blow-off device that occurs with passage of time, produces no noise running at a low speed, has high strength and durability, is very simplified and sturdy, trouble free and economic being low priced, and requiring low maintenance costs.

This aerator waterwheel 1 is effective as a waterwheel 1 for cooling hot or warm water without any modification. The conventional system of raising a large amount of heavy water to the top of a water cooling tower, and sprinkling it, shows lower efficiency than the water bottom air blow-off, and consumes a large amount of energy. The aerator waterwheels of this invention may be arranged in series or parallel all over the tank to be cooled; the tank is provided with a simple cover; then, adoption of the forced draft system of blowing in air horizontally from one side, and discharging it from the other side, may be readily practiced. This system requires less air blowing pressure than the cooling tower system. The saving effect both with water pumps and blowers is large; use of large amounts of contact media to be put in the tower is not needed, and the water cooling plant itself can be built at very low costs. The apparatus of this invention provides a more energy saving means than the fountain type cooling tank.

What is claimed is:

1. An aerator waterwheel system, means to rotate said shaft; comprising in combination:
   (a) a support shaft (3) with bearing support means (11) to support the shaft above water for rotation at a slow rate of speed at a workstation;
   (b) a pair of disc-shaped end plates (4) mounted on said shaft at opposite sides of said workstation; and,
   (c) a plurality of synthetic resin, cylindrical, interwoven honeycombed rotating tubes (2a) each having numerous small perforations on their circumference, each being disposed between said end plates (4) and rigidly secured thereto substantially at the periphery thereof, each with a central axis disposed parallel to said shaft (3) and encircling the same so as to form waterwheel wings (2) around said shaft, said wings being so disposed at said workstation that the tubes when in the lower phase of a cycle of rotation are immersed in water, said shaft being rotated at a slow speed so that splashing does not occur.

2. An aerator waterwheel as claimed in claim 1 wherein the end plates are provided with cylindrical protrusions and the honeycombed rotating tubes are rigidly secured thereto by putting each end thereof on a protrusion.

3. An aerator waterwheel system as claimed in claim 1 wherein the tubes have an undulating rough surface inside and outside thereof which are very coarse and are provided with a part of the tube which is an elongated solid wall.

4. An aerator waterwheel system as claimed in claim 3 wherein said solid wall is so disposed at an angle as to serve as a scooping board.

5. An aerator waterwheel system as claimed in claim 1 wherein two of said honeycombed cylindrical tubes are welded together integrally at abutting sides.

6. An aerator waterwheel system as claimed in claim 1 including a vertical diaphragm beneath the bottom of the aerator waterwheel wings (2) and an arcuate diaphragm, contiguous to the top of said vertical diaphragm following closely the profile of the outer circumference of the waterwheel system so as to induce a circulating water flow as the shaft rotates.

* * * * *